Sept. 9, 1947.  W. T. LEE  2,427,146
PASTEURIZER
Filed July 15, 1944  2 Sheets-Sheet 1
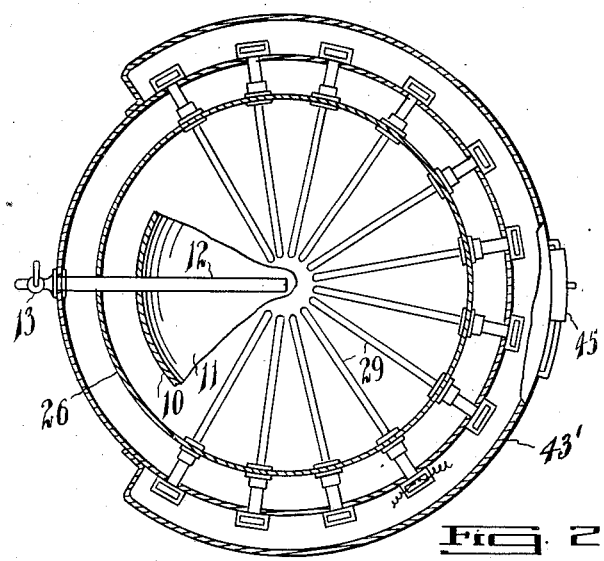
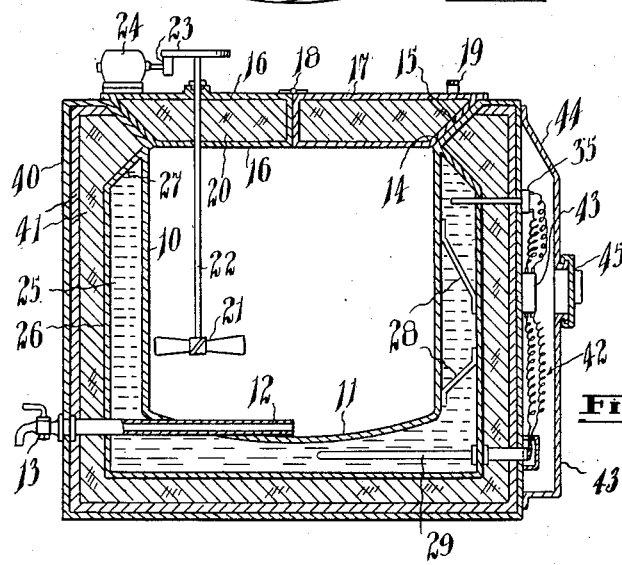
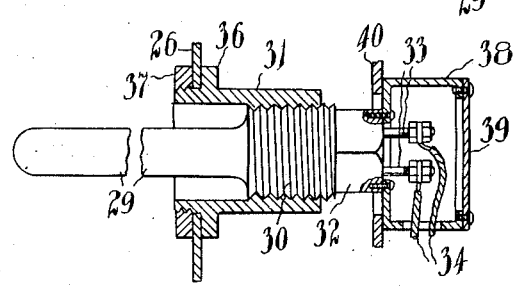
Inventor
W. T. Lee
by Frederick E. Bromley
Atty.

Sept. 9, 1947.  W. T. LEE  2,427,146
PASTEURIZER
Filed July 15, 1944  2 Sheets-Sheet 2

Inventor
W. T. Lee
by Frederick C. Bromley
Atty.

Patented Sept. 9, 1947

2,427,146

UNITED STATES PATENT OFFICE 2,427,146

PASTEURIZER

William T. Lee, Norfolk, Va.

Application July 15, 1944, Serial No. 545,181

4 Claims. (Cl. 219—39)

The invention relates to improvements in pasteurizers for milk and fruit juices as described in the present specification and shown in the accompanying drawings which form a part of the same.

An object of the invention is to provide a highly efficient and serviceable pasteurizer in which heating is accomplished by a heat exchanger provided with a group of electric units of the immersion type, which are controlled thermostatically.

A further object of the invention is to provide a pasteurizer having an inner vessel for containing milk or other fluid to be treated and having an outer vessel containing an enclosed body of water electrically heated to a predetermined temperature by which a desired balancing point is secured over a given holding period.

A still further object of the invention is to provide a pasteurizer of the character described in which a water chamber is heated by a group of electric heaters connected in a manner such as to produce a saving in power consumption.

A still further object is to furnish an appliance of the character described which is particularly suited for farm use, and one which can be manufactured for handling small or large gallonage. Other objects and advantages will be apparent from the ensuing detailed description of the invention.

In the drawing,

Fig. 1 is a vertical section of the invention constructed as a vertical type of pasteurizer.

Fig. 2 is a cross section thereof showing the arrangement of the electric heating elements in the base portion.

Fig. 3 is a view detailing the manner in which the heating elements are mounted.

Like numerals of reference indicate corresponding parts throughout the drawings of the invention.

Figure 4:
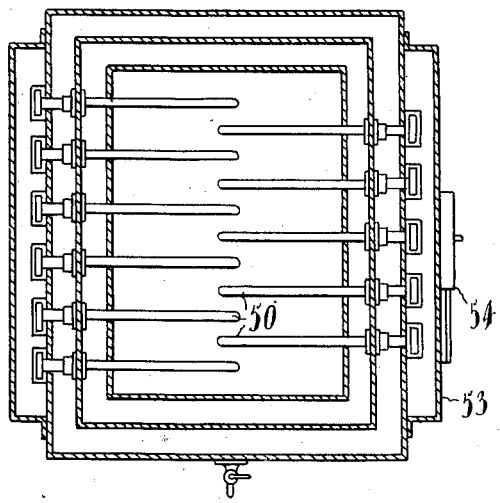
Fig. 4 is a cross section of a horizontal type of pasteurizer constructed in accordance with the invention, the section being taken on line 4—4 of Fig. 5.

Referring at first to Figs. 1, 2 and 3 of the drawing, the pasteurizer is illustrated as of the vertical type and there is depicted an inner shell and an outer shell sealed to each other at or near the top to provide a closed water chamber surrounding the inner shell. The lower part of the chamber contains elements which are turned on and off by a manual switch and controlled by a thermostat. The switch and the electrical connections of the heating elements and the thermostat are encased. The water chamber is insulated to prevent heat loss.

The inner shell is a tank or cylindrical vessel 10 for milk and is of stainless steel constructed in approved manner and preferably having a dished bottom 11 to facilitate its being cleansed from time to time in order that it may be kept in a sanitary condition. At the bottom 11 there is a discharge pipe 12 extending horizontally therethrough and through the water chamber and its insulating jacket. The pipe is a stainless steel member having its inner, or inlet end, disposed above the interior surface of the bottom and supplied with a faucet 13 at its outer end. By removing the faucet the discharge pipe can be cleaned throughout its length. This construction is in accord with requirements of health authorities.

The upper edge or mouth 14 of the vessel 10 is flared outwardly to provide a seat for a lid having a bevelled peripheral edge 15 adapted to engage the flared mouth. This lid is formed into two similar parts 16 and 17 by a diametrical division and the parts are hingedly united as at 18. It is an advantage to fashion the lid in this manner because only one part need be raised to pour milk into the vessel. This part is furnished with a handle 19. The other part carries an agitator. Both sections of the lid are made of stainless steel and each is chambered and has its chamber packed with insulation, such as cork, indicated at 20. The insulation may include felt layers.

The agitator comprises a paddle wheel 21 of the radial blade type mounted on a depending shaft 22 driven by friction wheels 23 of which the driving member is mounted on the shaft of an electric motor 24. The agitator is operated at a speed sufficient to keep the milk thoroughly stirred so that the cream content will be uniformly distributed while the pasteurizing treatment is being performed.

The water chamber 25 is provided by the outer shell 26 which is a cylindrical vessel formed of sheet copper in approved manner and having the top edge flared inwardly as at 27 and united at the base portion of the mouth 14 to the inner vessel 10. Said top edge 27 is united in fluid-tight engagement as by brazing or soldering a flange juncture as will be well understood in the art. The water chamber completely encircles the inner vessel and extends below the bottom thereof. Suitably spaced around the inner vessel are angle braces as at 28 connected to the same and to the outer vessel as by brazing or soldering. The braces rigidly unite the sides of said vessels and relieve the upper connection of strain due to the weight of the milk.

Extending radially inwardly through the side wall of the outer vessel 26 is a plurality of electric heating elements 29 of the immersion type. The heating elements are equally spaced from one another and preferably there is a group of twelve. Each has a cylindrical body which extends across and below the inner vessel and terminates short of the centre thereof. A head end 30 is screw threaded in a bushing 31 and has a head 32 for receiving a wrench. Terminals 33 project from the head and are connected at conductors 34 forming part of the electric circuit. The heating elements heat water sealed in the chamber 25, which in turn heats the inner vessel.

The temperature to which the water is raised is controlled by a thermostat 35 of the immersion bulb type.

The bushings 31 are permanently attached to the side wall of the vessel 26 by means of a fluid-tight connection as best shown in Fig. 3. The attachment of each bushing to said side wall is effected by inserting the inner end thereof in an aperture therein and securing it by a flange 36 at one side and a screw collar 37 at the other side. The flange and the collar are brazed or soldered to the side wall after the collar has been tightened. The heating elements are screwed into the bushings by a wrench applied to the heads 32. The terminals 33 of each heating element are encased in a standard outlet box 38 attached to the end face of the head 32. The removable cover of the outlet box is denoted at 39.

The heat exchanging vessel 26 is insulated against loss of heat through its side and bottom walls by means of an encasing jacket comprising a case 40 packed with cork and felt as indicated at 41. The top of the case is united with the flared mouth of the inner vessel. The heating elements 29 project outwardly through the insulating jacket, and the outlet boxes 38 are disposed at the outer face of the case 40. The thermostat 35 is mounted on the side wall of the case 40 and projects through the insulation and into the water chamber of the heat exchanger 26.

The heating elements are series wired in pairs and the pairs are wired in parallel so that the two 115 volt elements are energized by a 230 volt line, which balances the load and reduces operation cost. For instance a pasteurizer of a 60 gallon capacity would draw 7200 watts or 72 amps. on a 115 volt line; whereas on a 230 volt line the load would only be 3600 watts or 36 amps.

The electric circuit of the heating elements and the thermostat is generally indicated by the character 42 in Fig. 1 and the switch is denoted at 43. The switch is of the double-pole single throw type and is mounted on the side of the case 40. The switch, the outlet boxes 38 and their electric connections and also those belonging to the thermostat are housed in a shield 43′ encircling the case 40 and united therewith as by brazing or soldering. The shield is inwardly and upwardly flared as at 44 to the top of the case and supplied with a hand hole opposite the switch for the attendant. The hand hole has a closure preferably in the form of a slide door 45. Both the shield and the door are constructed of stainless steel.

In the use of the pasteurizer the thermostat is set to open the circuit of the heating elements at a required temperature of say 180° F. The switch is closed and milk at a temperature of 45° to 48° F. is poured in when the water has been heated to the desired temperature of 180° F. at which time the thermostat comes into operation and the attendant is visually signalled by a conventional pilot light. The attendant then opens the switch and a holding period of thirty minutes is allowed to elapse. At the end of the holding period the fluids balance at a temperature of 143° F. Since the power is shut off there is no consumption of energy during the holding period. It is a requirement of boards of health that a thirty minute holding period ensue in the pasteurization treatment and that there shall be only a 2° variation in temperature. The present invention provides an appliance and mode of treatment which enables such rigid requirements to be fully complied with.

Figure 5:
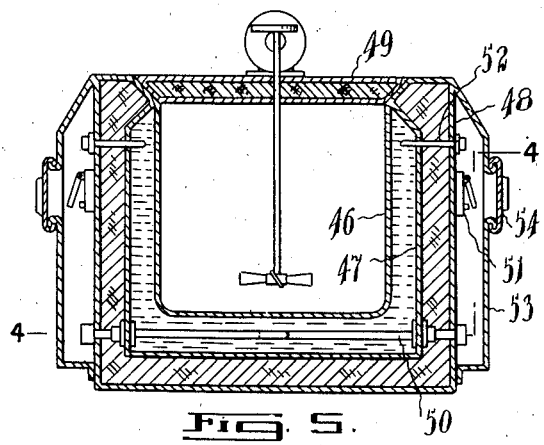
Fig. 5 is a vertical sectional view of Fig. 4.
Figure 6:
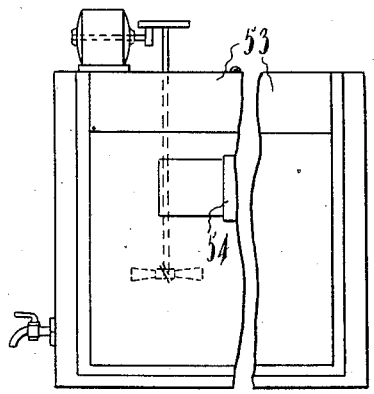
Fig. 6 is a side elevation of Fig. 5.

Figs. 4, 5 and 6 illustrate the invention as applied to a horizontal pasteurizer. The inner vessel 46, the outer vessel 47 and the insulating jacket 48, are of the same construction as the vertical unit except that they are of a rectangular shape in plan instead of circular. The lid, denoted at 49 is also a two-part member supporting an agitator. The heating elements 50 are also similar to those previously described, but are arranged in two groups, and extending inwardly from opposite sides of the outer vessel and staggered as shown in Fig. 4. Each group has a separate circuit controlled by a switch 51 and a thermostat 52. The switch, the thermostat and the electric connections of the heating elements of each group are housed in a shield 53 at the respective sides of the appliance and the shield has a slide door 54 for access to the switch encased thereby.

Figure 7:
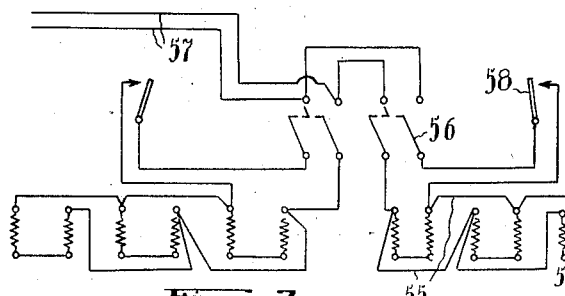
Fig. 7 is a diagrammatic illustration of the electric heating elements and their circuits.

By adverting to the electric diagram shown in Fig. 7 it will be seen that each group of heating elements have their resistance 54 series wired as at 54′ in pairs and the pairs are wired in parallel as at 55. The circuit of each group has a double-pole single throw switch 56 by which a connection is made with a 230 volt service line denoted at 57. The heating elements are of the 115 volt type and by the hook-up herein disclosed the load is completely balanced with a substantially reduced power consumption. The thermostat of each circuit is conventionally denoted at 58, and it is to be understood that the circuit for the heating elements of the vertical pasteurizer is similar to that just described except that only one switch is required since the heating elements are not separated into two groups.

While the invention has been described in its preferred form it will be manifest that such modifications thereof may be resorted to as come within the scope of the appended claims.

What I claim is:

1. A pasteurizer comprising an inner vessel, an outer vessel in sealed engagement with the top of the inner vessel and providing a chamber about the sides and the bottom thereof, said chamber being substantially filled with liquid and closed to permanently seal the liquid therein, an immersion heating element disposed in the bottom of said chamber, the heating element adapted to heat said liquid and the liquid adapted to heat said inner vessel, a thermostat disposed in the chamber and connected in series with said heating element, and a switch connected with the heating element by which the circuit thereof is adapted to be opened manually after operation of the thermostat so that at the end of a holding period a predetermined balancing point is obtained between said liquid and fluid heated in the inner vessel.

2. A pasteurizer comprising an inner vessel, an outer vessel in sealed engagement with the top of the inner vessel and providing a chamber about the sides and bottom thereof, said chamber being substantially filled with liquid and closed to permanently seal the liquid therein, a plurality of immersion heaters disposed in the bottom of said chamber and in circuit with one another, the immersion heaters adapted to heat said liquid and the liquid adapted to heat fluid in said inner vessel, a thermostat disposed in said chamber and connected in series with said immersion heaters, and a switch in the circuit of the immersion heaters adapted to be opened manually after operation of the thermostat so that at the end of a holding period a predetermined balancing point is obtained between said liquid and said fluid.

3. A pasteurizer comprising an inner vessel, an outer vessel in sealed engagement with the top of the inner vessel and providing a chamber about their sides and bottom thereof, said chamber being substantially filled with liquid, and closed to permanently seal the liquid therein, a plurality of immersion heaters disposed in the bottom of said chamber and in circuit with one another, the immersion heaters adapted to heat said liquid and the liquid adapted to heat fluid in said inner vessel, a casing constructed as a unit with the said vessels and providing a compartment about the sides and bottom of the outer vessel, insulating material therein, a thermometer disposed in said chamber and connected in series with said immersion heaters, and a switch in the circuit of the immersion heaters adapted to be opened manually after operation of the thermostat so that at the end of a holding period a predetermined balancing point is obtained between said liquid and said fluid.

4. The method of pasteurizing milk consisting in providing an inner receptacle for containing milk and an outer insulated vessel containing a liquid sealed therein which is electrically heated and temperature controlled, and proportioning the body of said liquid so that when it is heated to a temperature moderately above the holding point of pasteurization and the inner vessel is then filled with milk the heated liquid and the milk will balance thermally at a given holding point in the exchange of heat without detrimental lowering of temperature during the holding period.

WILLIAM T. LEE.

REFERENCES CITED

The following references are of record in the file of this patent:

UNITED STATES PATENTS

| Number | Name | Date |
|---|---|---|
| 1,925,877 | Mitchum | Sept. 5, 1933 |
| 1,984,956 | Anglin | Dec. 18, 1934 |
| 2,006,299 | Kaestner | June 25, 1935 |
| 2,196,012 | Gilbert | Apr. 2, 1940 |
| 2,249,036 | Peters | July 15, 1941 |
| 2,371,807 | Dalzell et al. | Mar. 20, 1945 |
| 1,047,418 | Kercher | Dec. 17, 1912 |
| 1,143,568 | Barnstead | June 15, 1915 |
| 1,184,091 | Frickey | May 23, 1916 |
| 1,268,928 | Colby | June 11, 1918 |
| 1,403,471 | Field | Jan. 10, 1922 |
| 1,892,557 | McCormick | Dec. 27, 1932 |
| 1,975,516 | DeSouza | Oct. 2, 1934 |
| 1,983,118 | Bourque | Dec. 4, 1934 |
| 2,236,837 | Rimmel | Apr. 1, 1941 |
| 2,311,199 | Astradsson | Feb. 16, 1943 |